United States Patent [19]

Ploegaert et al.

[11] Patent Number: 4,510,793

[45] Date of Patent: Apr. 16, 1985

[54] METHOD OF MONITORING THE WEAR OF A REFRACTORY LINING OF A METALLURGICAL FURNACE WALL

[75] Inventors: Hendrikus T. Ploegaert, Castricum; Ronald N. Molenaar, Heemskerk; Johannes A. M. Butter, Uitgeest, all of Netherlands

[73] Assignee: Hoogovens Groep B.V., IJmuiden, Netherlands

[21] Appl. No.: 498,152

[22] Filed: May 25, 1983

[30] Foreign Application Priority Data

Jun. 3, 1982 [NL] Netherlands .................. 8202239

[51] Int. Cl.³ ........................................... G01N 29/04
[52] U.S. Cl. ........................................ 73/86; 73/597
[58] Field of Search .................. 73/86, 597, 629, 627

[56] References Cited

U.S. PATENT DOCUMENTS 3,056,284  10/1962  Marsh et al. .................. 73/86
3,587,299   6/1971  Foley ............................. 73/86
4,269,397   5/1981  Strimple et al. ................ 73/86

Primary Examiner—Anthony V. Ciarlante
Attorney, Agent, or Firm—Stevens, Davis, Miller & Mosher

[57] ABSTRACT

A process for monitoring the wear of a refractory lining of a metallurgical furnace wall during use of the furnace, it is sought to improve the reliability and accuracy of the measurement comprising the following steps:
(1) arranging a bar of ceramic material in the wall so that the bar has an inner end at the inner face of the lining and extends to the exterior of the wall, the bar thus being subjected to wear at its inner end as the lining wears and determining
(2) the position of the worn inner end of the bar ultrasonically by generating ultrasonic pulses in the bar and detecting the reflection of the pulses from the worn inner end of the bar.

7 Claims, 2 Drawing Figures

METHOD OF MONITORING THE WEAR OF A REFRACTORY LINING OF A METALLURGICAL FURNACE WALL

BACKGROUND OF THE INVENTION

The invention relates to a method of monitoring the wear of a refractory lining of a metallurgical furnace wall during use of the furnace. The method is particularly applicable to a blast furnace wall.

Various different methods for measuring this wear are known. In general, the known methods are not reliable or effective.

SUMMARY OF THE INVENTION

The object of the invention is to provide a reliable, accurate method of monitoring the wear of the refractory lining of a metallurgical furnace wall.

In the present invention, a measurement of the ultrasonic length of a ceramic material bar extending from the inside face of the lining to the exterior of the wall is performed intermittently to determine the position of the inner end of the bar and its condition of wear. The bar subjected to wear in the same way as the lining. The ultrasonic test may be carried out by generating a pulse in the bar and detecting the reflection of the pulse from the inner end of the bar.

The bar may be inserted easily in an existing furnace, by making a hole in the furnace armor and an extension of that hole in the refractory lining and then inserting the bar so that its inner end comes to coincide with the inner face of the lining. The outer end of the bar, which preferably projects outwardly from the furnace armor, can be attached to the ultrasonic test apparatus as desired.

By this method it is possible to meet requirements for reliability and accuracy.

There have been proposals for use of ultrasonics in detection erosion, in fields different from metallurgical furnaces. U.S. Pat. No. 3,056,284 describes a bar of special shape which is intended to project into an atmosphere which is corrosive or which deposits material onto the bar. The aim is to test the atmosphere, not to detect wall wear. U.S. Pat. No. 3,587,299 describes detection of the char rate of an ablative layer by embedding at different depths in the layer a plurality of sound reflectors. If the layer has charred to the depth of a reflector, a sound pulse is not reflected from that layer on testing.

As the material of the bar, there should preferably be chosen a material which, both chemically and mechanically, exhibits a wear resistance substantially or almost identical to that of the refractory material of the furnace wall under the conditions in the furnace. The material also should have suitable acoustic properties. An $Al_2O_3$ bar, which has good ultrasonic properties because of its texture, has been found to be admirably suitable for the purpose. The bar preferably has a diameter of at least 10 mm and preferably an initial length of 50 to 80 cm, but these dimensions depend on the requirements of the particular case and the initial thickness of the furnace wall.

Under certain circumstances, it is preferable for the bar to be acoustically insulated from the refractory lining of the furnace wall.

BRIEF INTRODUCTION OF THE DRAWINGS

A preferred embodiment of the invention, together with its advantages, will now be described by way of non-limitative examples with reference to the drawing, in which:

FIG. 1 is a schematic representation of one way of carrying out the method of the invention; and FIG. 2 is a cross-sectional view of a blast furnace wall showing the arrangement of the bar in the refractory material of the lining, for performance of the invention as shown in FIG. 1.

DESCRIPTION OF THE PREFERRED EMBODIMENT

Figure 1A:
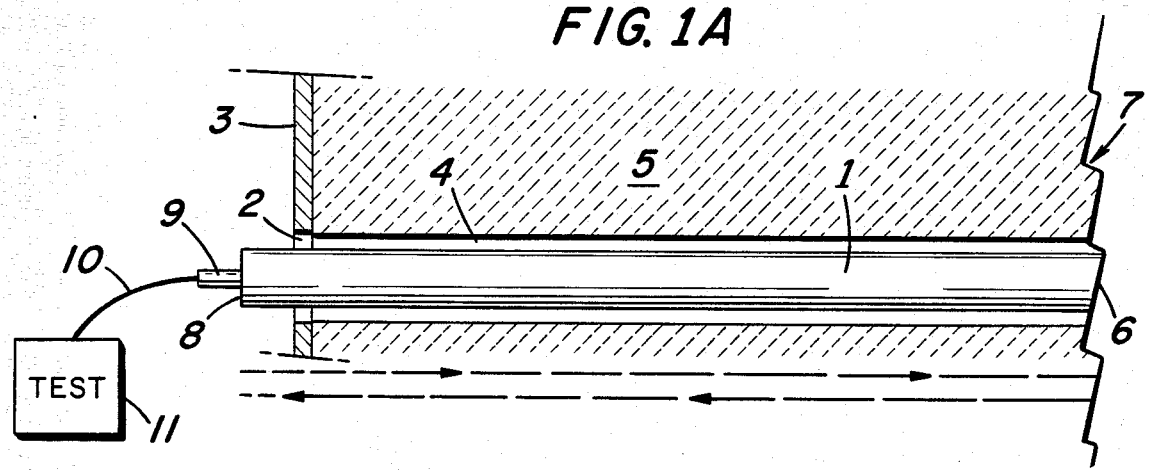
Figure 1B:
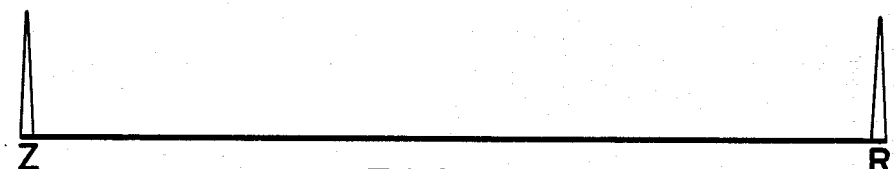

As shown in part A of FIG. 1, the method of the invention is performed by pushing a ceramic bar 1 through an opening 2 in the steel armor 3 of the blast furnace, which hole has been drilled for this purpose, and through a recessed or drilled duct 4 in refractory brick lining 5 of the blast furnace, so that the inner end 6 of bar 1 comes to lie flush with the inner face 7 of refractory lining 5. The bar 1 is cemented in position behind the armor 3 in the refractory lining 5 of the furnace wall.

If the bar 1 wears at the same rate as the refractory lining 5 of the furnace wall during use of the furnace, its length is a measure of the remaining wall thickness at any time. The material of the bar 1 is therefore selected to have a substantially identical wear resistance, chemically and mechanically to that of the material of the lining 5. It can then be assumed that the bar wears away at substantially the same rate as the lining, so that its inner end is always substantially at the inner face of the lining.

Moreover, the material of the bar should have good acoustical properties, particularly the ability to conduct ultrasonic vibrations, with little absorption or disturbance of such vibrations. Finally the bar and its material should affect the environment as little as possible, which implies that the normal wear of the furnace wall must not be influenced by the presence of the bar. In particular, the conduction of heat from the hot furnace via the bar must not give rise to local temperature differences compared to other corresponding points on the inner side of the refractory lining. It has been found that a bar of $Al_2O_3$ gives particularly good results and has good ultrasonic properties. Such bars are commercially available under various brand names. Permanently or when it is desired to make a measurement of the lining thickness, an ultrasonic probe 9 is placed against the head 8 of the bar, which projects from the armor 3. If desired a coupling paste or the like is used. The probe or sensor 9 is connected by an electrical connection 10 to the ultrasonic test apparatus 11.

Part B of FIG. 1 represents beneath the length of the bar of FIG. 1A, the transmission pulse Z which is generated by the probe 9 in the ceramic material of bar 1, together with the pulse R reflected at the inner end 6 of the bar 1 i.e. at the inner face of the lining 5. Since the acoustic velocity in the bar material is known, the present length of the bar 1 and therefore the wall thickness of the refractory lining 5 may be determined from the delay in time between the pulses Z and R.

It is known that different types of oscillations may be generated in a bar such as the bar 1, depending on the frequency, bar diameter and velocity of sound in the bar material. In a practical example, with a bar of $Al_2O_3$ having a diameter of 10 mm for example, a complex vibration (so-called bar vibration) is generated at a frequency lower than about 4 MHz. At frequencies above about 4 MHz, an almost purely longitudinal vibration is produced in the bar. Bar vibration does indeed have the advantage that the efficiency at which it is generated is relatively high, but one disadvantage is that the acoustical energy introduced is readily transmitted to the surrounding refractory material. At the same time the reflections at the inner end 6 of the bar 1 are less sharply defined, which makes it more difficult to interpret the measured result.

However, longitudinal vibration has the advantage that almost no energy is transmitted to the surrounding material, and that the reflections at the end of the bar are more sharply defined. But these relatively high frequencies have the disadvantage that the damping of the sound impulse in the bar increases, and also that unevenness of the end surface 6 of reflection has a more significant effect.

Details of a practical method of application of the invention will be discussed with reference to FIG. 2. This is applicable to an existing furnace and to a new furnace or a new lining of a furnace.

Figure 2:
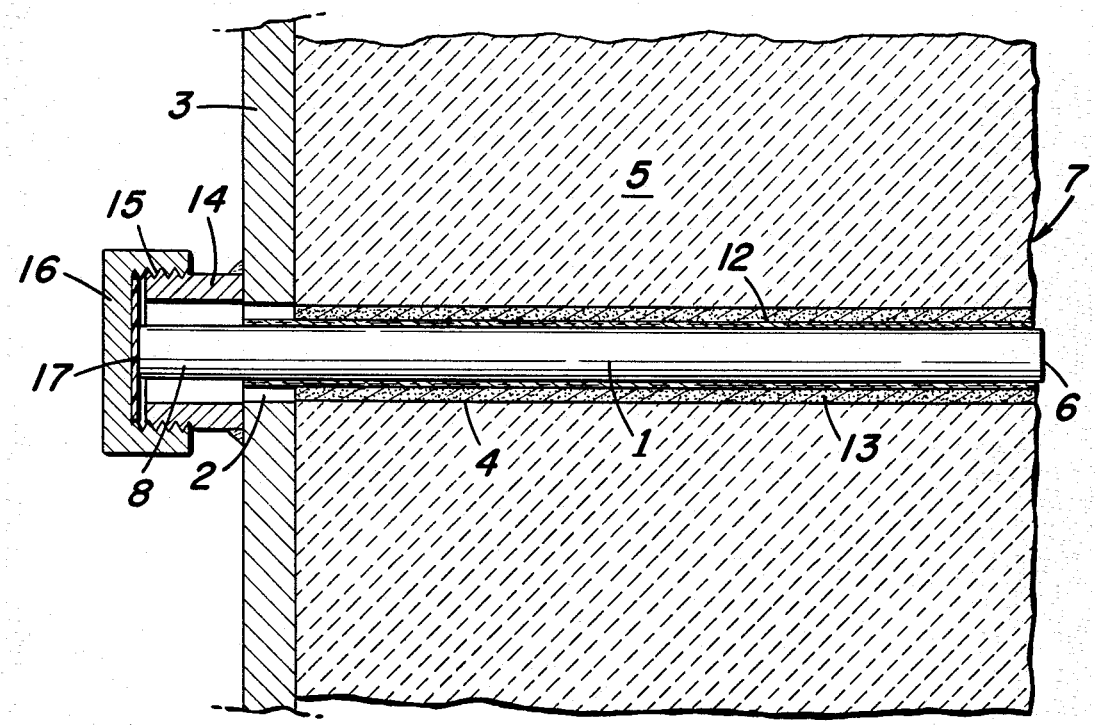

In order to obtain the construction shown in FIG. 2, one of the following procedures is adopted:

(1) in an existing furnace, firstly an opening 2 is drilled in the steel armor 3, and then a hole or duct 4 is formed concentrically with and identical in size to, or slightly smaller than, the opening 2 in the refractory lining 5. The diameter of the drilled hole 4 depending on the chosen bar diameter, must enable the bar 1 to be easily inserted. The length of the drilled hole 4 is measured by a conventional method, and the length of the bar to be inserted adapted to it.

The bar 1, which is insulated acoustically by means of a layer of plastic and/or aluminium foil, is then pushed through the opening 2 in the armor into the duct 4, and optionally is secured in duct 4 by refractory putty 13. Various methods may be used for this purpose, and these need not be explained further to an expert in this field. It has been found that, in this way, sufficient acoustical insulation of the bar 1 in the refractory lining 5 is provided to permit generation not only of longitudinal vibration but also of bar vibrations.

The end of the bar 1 projecting from the furnace is protected from any undesirable mechanical damage by welding a bush 14 on the armor 3, which bush is provided, on the outer side for example, with a screw-thread 15. The inserted bar 1 projects slightly from the bush 14. A screw-cap 16 seals the bush 14 so that it is gas-tight, and lies flush with the head 8 of the bar 1. A teflon disc 17 on the inner side of the screw-cap 16 protects the head 8 against too high a surface pressure, and also prevents undesirable movement of the bar 1 when the cap 16 is twisted;

(2) in a new furnace or a new lining in an existing furnace, a slightly different insertion method may be used. The inner face of the furnace is still accessible, for example the refractory lining 5 being newly installed can be prepared with a groove or recess in the bricks, to receive the ceramic bar 1.

In other words, instead of actually drilling a continuous hole in the refractory lining of the blast furnace, access can be achieved by using a refractory lining in which such a hole is pre-formed. This hole may be predrilled, but a slot shaped duct may also be produced in joint between two bricks of the refractory lining. Methods for achieving this are known and need no further explanation.

It will be clear that the opening 2 in the armor 3 need only be made once even if the refractory lining 5 is subsequently changed or renewed.

The selection of a larger bar diameter provides the possibility of reducing the frequency at which longitudinal vibrations are generated, with the resulting effect that the damping and the sensitivity of the measurement to roughness of the surface of reflection are reduced. Longitudinal vibrations may then be more usefully employed for measuring the length of the bar, which means that the bar vibration, with the associated requirement of acoustical insulation from the refractory lining 5, does not occur, and that the bar can be mechanically better secured.

The desired accuracy for measuring the wall thickness of the lining, as required by operators of a blast furnace, is about 1 to 2 cm. This requirement can be easily met by the illustrated method. In a blast furnace, the bar should preferably be inserted above the tuyeres in the blast furnace wall, where wear is the greatest. It is known that the cooling plates used in blast furnaces influence the wear pattern, and it is therefore recommended that measuring bars are inserted between the cooling plates. When the initial thickness of the furnace wall in two cases (excluding the thickness of the armor) was 40 cm and 70 cm respectively, bars with lengths of 50 and 80 cm respectively were used. A minimum bar thickness of 10 mm is desirable for measuring purposes.

What is claimed is:

1. A method of monitoring the wear of a refractory lining of a metallurgical furnace wall during use of the furnace, comprising the steps of:
    (1) arranging a bar of ceramic material in said wall so that the bar has an inner end at the inner face of the lining and extends to the exterior of the wall, the bar thus being subjected to wear at its inner end as the lining wears and
    (2) determining the position of the worn inner end of the bar ultrasonically by generating ultrasonic pulses in the bar and detecting the reflection of said pulses from the worn inner end of the bar.

2. A method according to claim 1 wherein the material of the bar has, chemically and mechanically, substantially the same wear resistance to the furnace contents as the material of the refractory lining.

3. A method according to claim 1 or claim 2 wherein the material of the bar is $Al_2O_3$.

4. A method according to one of claims 1 and 2 including acoustically insulating the bar from the refractory lining.

5. A method according to claim 1 wherein the bar has a diameter of at least 10 mm and, before wear, a length in the range 50 to 80 cm.

6. A method according to any one of claims 1, 2 and 5 wherein the furnace is a blast furnace.

7. A method according to claims 1, 2 or 5 including drilling a hole through an outer metal armor of the wall and through the lining and inserting the bar into the hole and securing it in position.

* * * * *